Sept. 2, 1952     H. B. BARRETT     2,609,310
BRAKE SHOE BONDING MACHINE
Filed Sept. 10, 1949     3 Sheets-Sheet 1
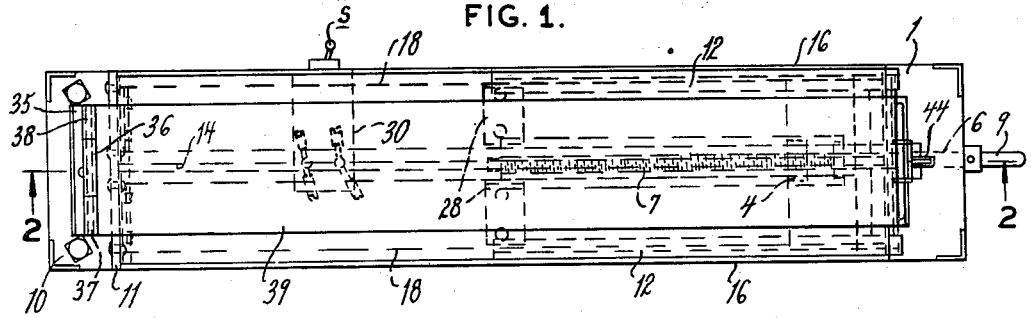
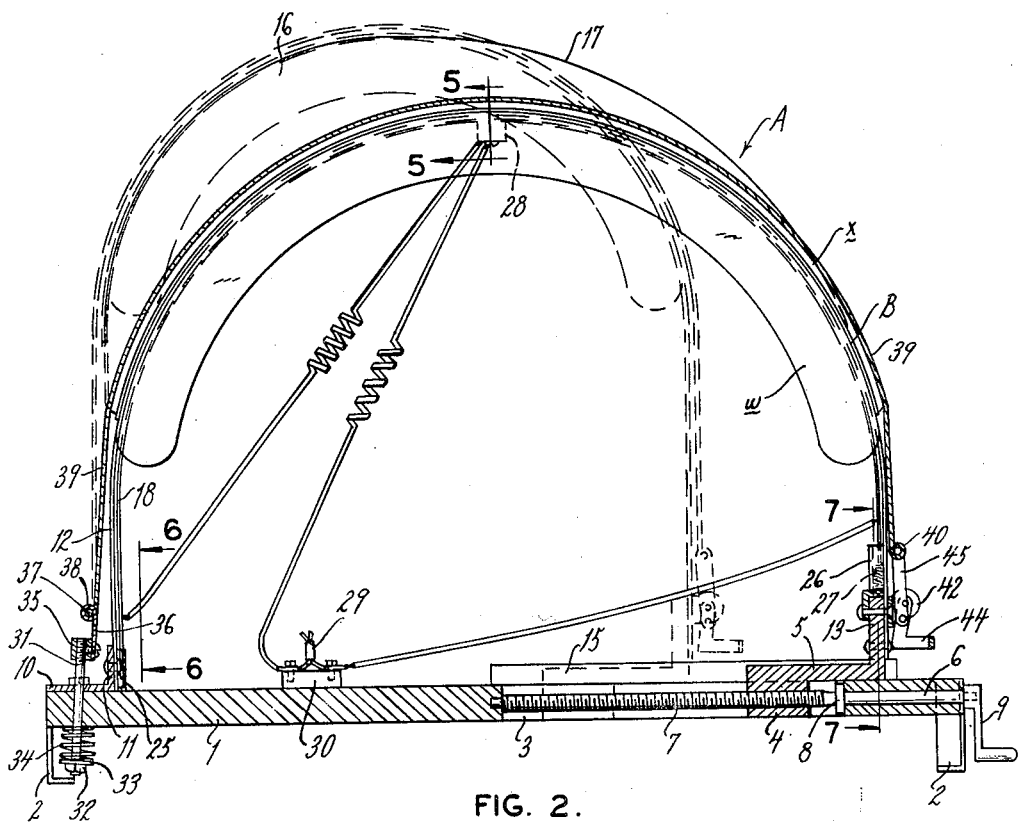
INVENTOR
HARRY B. BARRETT
BY
ATTORNEY Sept. 2, 1952  H. B. BARRETT  2,609,310
BRAKE SHOE BONDING MACHINE
Filed Sept. 10, 1949  3 Sheets-Sheet 2
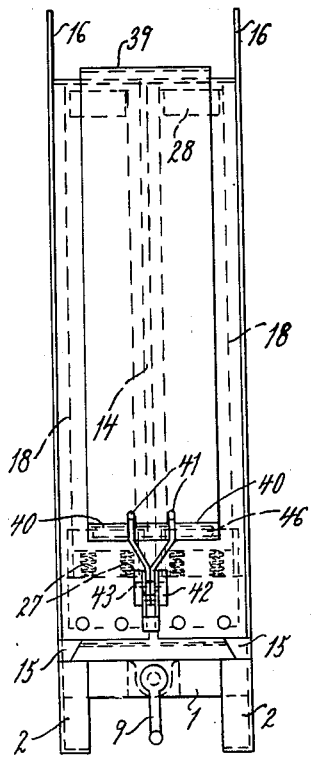
FIG. 3.
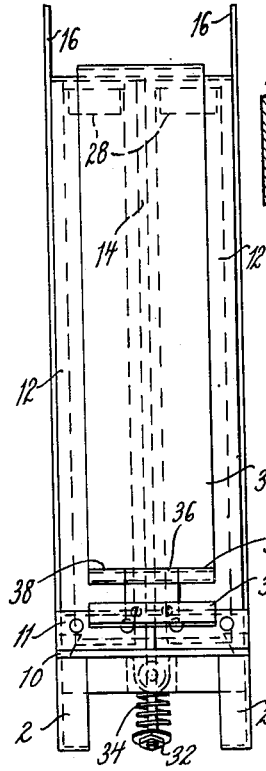
FIG. 4.
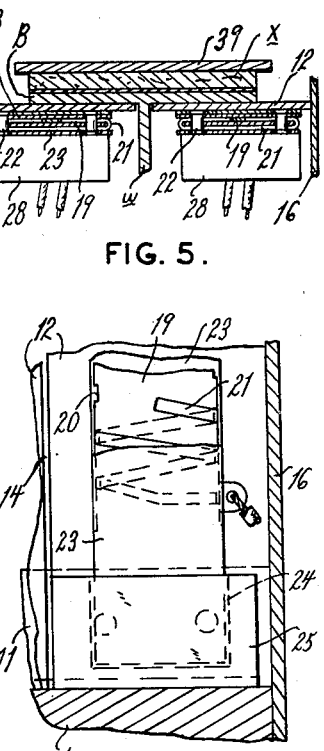
FIG. 5.
FIG. 6.
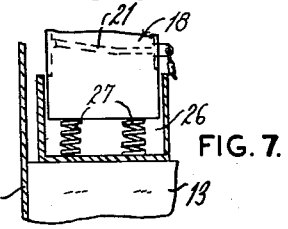
FIG. 7.
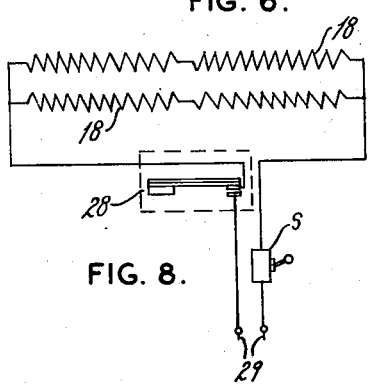
FIG. 8.
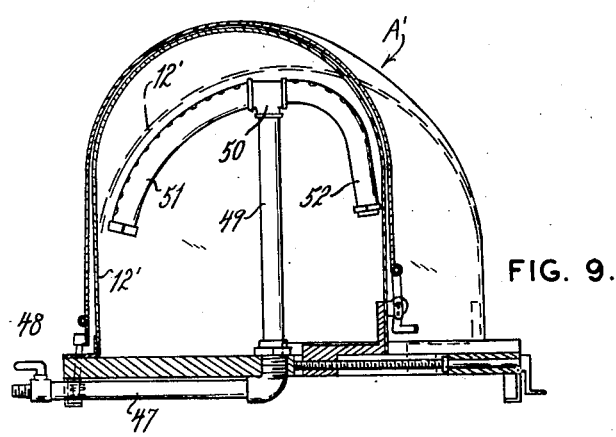
FIG. 9.
INVENTOR
HARRY B. BARRETT
BY Alfred W. Petchaft
ATTORNEY Sept. 2, 1952        H. B. BARRETT        2,609,310
BRAKE SHOE BONDING MACHINE
Filed Sept. 10, 1949        3 Sheets-Sheet 3
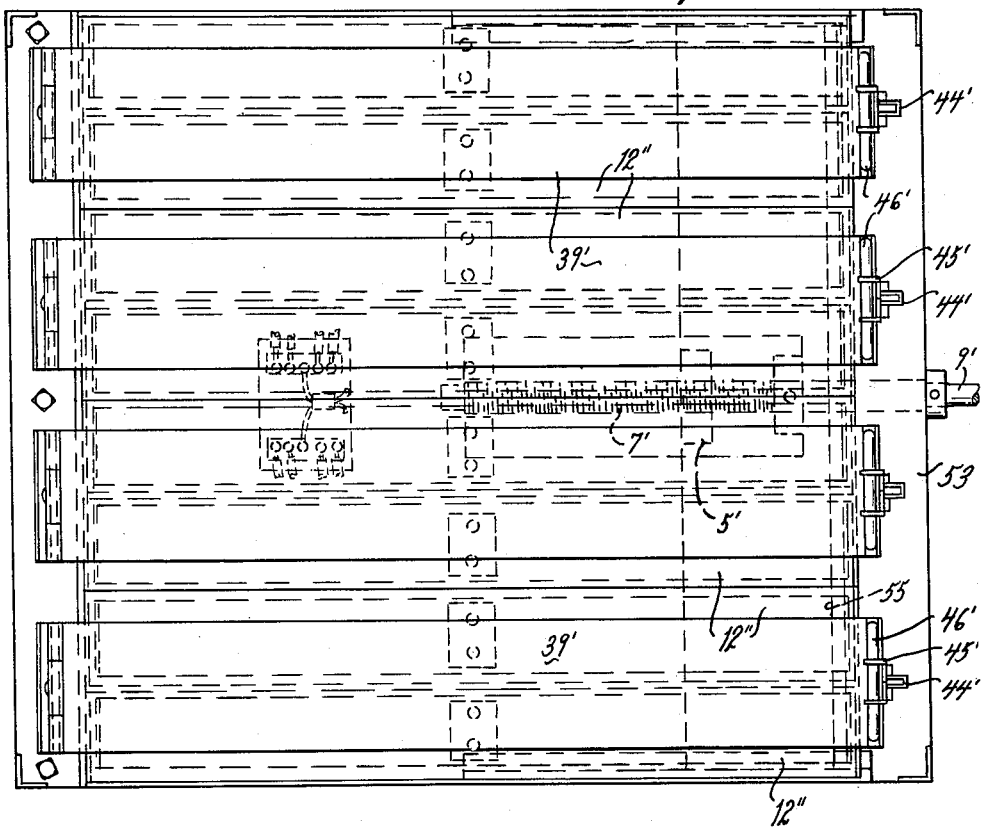
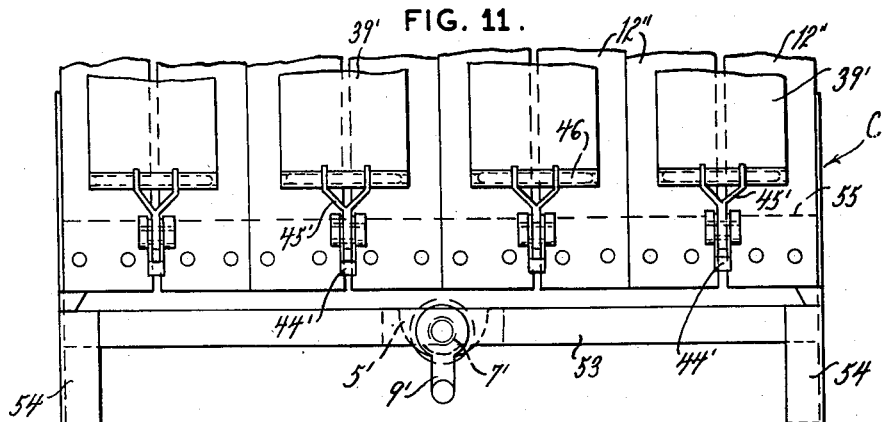
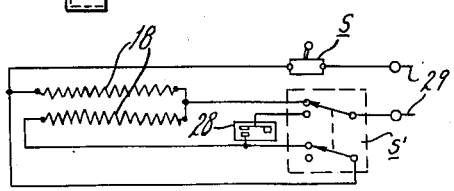
INVENTOR
HARRY B. BARRETT
ATTORNEY Patented Sept. 2, 1952

2,609,310

UNITED STATES PATENT OFFICE 2,609,310

BRAKE SHOE BONDING MACHINE

Harry B. Barrett, St. Louis, Mo.

Application September 10, 1949, Serial No. 115,075

5 Claims. (Cl. 154—1)

This invention relates in general to certain new and useful improvements in brake shoe relining devices and more particularly to a machine for accomplishing the several operations incident to effecting securement of brake lining to an automobile brake shoe by means of a thermosetting adhesive or the like.

It is the primary object of the present invention to provide a simple, highly efficient, inexpensive brake shoe relining machine which is capable of effecting a bond between brake lining material and a brake shoe by means of a thermosetting adhesive or the like.

It is a further object of the present invention to provide a brake shoe relining device of the type stated which can be readily adjusted to fit a wide range of types and varieties of brake shoes and can be so adjusted quickly and simply by the ordinary repair shop mechanic.

It is, likewise, an object of the present invention to provide a brake shoe relining device which may be initially used, if desired, to test the brake shoes for various defects such as warping, twisting, lack of concentricity, stretching, or shrinking and the like.

It is also an object of the present invention to provide a brake shoe relining device which may be used, if desired, to remove previously bonded, worn-out linings from brake shoes in a rapid, simple, and efficient manner.

It is another object of the present invention to provide a brake shoe relining device of the type stated in which heat is applied as directly as possible to the adhesive zone, so that the brake shoe and lining and particularly the adhesive zone therebetween will be brought up to bonding temperature can be maintained within relatively precise limits of control for any predetermined interval of time.

It is another object of the present invention to provide a brake shoe relining device of the type stated which supports the flanges of the shoe over a substantially true arc throughout their length while pressure is applied radially over substantially the entire face of the brake shoe lining, thereby preventing the shoe from warping or otherwise deforming during the heating or so-called "bonding" period.

It is also an object of the present invention to provide a brake shoe relining device of the type stated in which substantially uniform pressure is applied during the entire bonding period, that is to say, the pressure applying means, in a manner of speaking, "follows up" the normal expansion of the brake shoe as the temperature increases so as to maintain uniformly a predetermined amount of pressure within reasonably close limits.

It is a further object of the present invention to provide a device of the type stated which can be readily adjusted to accommodate for different thicknesses of the brake shoe flange and brake lining material in brake shoes of a given diameter.

It is an additional object of the present invention to provide a brake shoe relining device which may be constructed to accommodate simultaneously a plurality of brake shoes at one time and at one setting, so that sets of shoes can be bonded in a single operation as a group.

It is also an object of the present invention to provide a brake shoe relining device which is simple, economical, and rugged and otherwise highly efficient in general operation.

With the above and other objects in view, my invention resides in the novel features of form, construction, arrangement, and combination of parts presently described and pointed out in the claims.

In the accompanying drawings (three sheets):

Figure 1 is a top plan view of a brake shoe relining device constructed in accordance with and embodying the present invention;

Figure 2 is a longitudinal sectional view taken along line 2—2 of Figure 1;

Figures 3 and 4 are front and rear elevational views, respectively, of the brake shoe bonding device;

Figures 5, 6, and 7 are fragmentary sectional views taken along lines 5—5, 6—6, and 7—7, respectively, of Figure 2;

Figure 8 is a schematic wiring diagram showing the electrical connections to the brake shoe bonding device;

Figure 9 is a longitudinal sectional view of a modified form of brake shoe bonding device constructed in accordance with and embodying the present invention;

Figure 10 is a top plan view of a further modified form of brake shoe bonding device constructed in accordance with and embodying the present invention;

Figure 11 is a fragmentary front elevational view of the modified form of brake shoe bonding device shown in Figure 10; and Figure 12 is a schematic wiring diagram illustrating a modified form of electrical circuit which may be employed in connection with the present invention.

Referring now in more detail and by reference characters to the drawings, which illustrate practical embodiments of the present invention, A designates a brake shoe bonding machine comprising a horizontally disposed rectangular base plate 1 formed preferably of a heavy casting or forging and provided at its four corners with short legs 2 by which it may be supported in upwardly spaced relation upon a table, bench, or similar structure. Extending through the base plate 1 from top to bottom and located in the forward portion thereof midway between the lateral edges is a way-forming slot 3 for snugly and slidably accommodating a guide tongue 4 formed integrally with and depending from the under of a slide plate 5. Journaled at its opposite ends in the base plate 1, and extending lengthwise centrally along the slot 3, is a lead screw 6 which is diametrically enlarged and externally threaded, as at 7, along that portion of its length which is located within the slot 3 for extension through, and threaded engagement with, the tongue 4. To prevent longitudinal translation, the lead screw 6 is provided with a set collar 8 adapted to bear against one transverse end wall of the slot 3 and at its forward end the lead screw 6 projects outwardly from the base plate 1 and is rigidly provided with a crank-like handle 9.

Adjacent its rearward end, the base plate 1 is provided with an angle member 10 having a transversely extending upwardly presented flange 11. Riveted, welded, or otherwise rigidly secured to the flange 11 are spaced parallel bands 12 formed of heavy gauge spring steel, spring bronze, or other similar material, and extending upwardly in a semi-circular arc, being similarly secured at their forward ends to an upstanding flange 13 formed integrally with the slide block 5, thus forming therebetween a narrow slot 14. Thus, as the crank 9 is rotated in the proper direction, the slide block 5 will be run inwardly and the bands 12 will be flexed to a semi-circular shape on a smaller radius. Since the bands 12 were made of relatively heavy material, substantial mechanical force is required and, therefore, it is preferable to provide a pair of stabilizing guide bars 15 rigidly mounted on and extending longitudinally along the upper face of the base plate 1 for sliding engagement with the lateral faces of the slide block 5, thereby preventing any tendency of the slide blocks 5 to twist or turn as it moves inwardly and outwardly responsive to rotative movement of the lead screw 6.

Rigidly mounted upon the opposite longitudinal margins of the base plate 1 and extending vertically upwardly therefrom are side plates 16, the upper margins 17 of which are arcuately contoured so as to enclose the bands 12 in either of their extreme positions of adjustment, as well as all intermediate positions of adjustment. In other words, the upper margins 17 of the plate 16 along their forward portions have the shape or contour of the largest arc to which the bands 12 may be adjusted and along their rearward portions have the shape or contour of the smallest arc to which the bands 12 may be adjusted. The side plates 16 furthermore are spaced from each other, so that their inner faces will be substantially contiguous to, but not touching, the outwardly presented lateral faces of the bands 12. Thus, the bands 12 may move with relative freedom between the side plates 16, but the space or clearance will be so small as to prevent any appreciable or measurable circulation of air or heat loss.

Mounted in facewise contact against the under face of each band 12 is an electrical heating element 18 consisting of a central relatively narrow flat mica strip 19 conventionally provided along its longitudinal margins with a series of uniformly spaced notches 20 for receiving a zig-zag winding of Nichrome ribbon 21. Securely held on opposite sides of the strip 19 by rivets 22, or other suitable securement means, are relatively wider protective facing strips 23 also formed preferably of sheet mica or other suitable material. At its rearward end, the heating element 18 is set into a retaining socket 24 formed by a suitable stamped metal clip 25 rigidly mounted on the lower end of the flexible band 12. At its forward end, the heating element 18 is slidably mounted in a similar socket-forming clip 26 rigidly fastened upon the rear face of the flange 13.

Also disposed within the socket-forming clip 26 are compression springs 27 abutting at their lower ends against the transverse end face of the flange 13 and at their opposite ends against the downwardly presented end face of the heating element 18. Thus, each heating element 18 is resiliently urged upwardly to lie in snug-fitting engagement against the band 12 with which it is associated, and, as the band 12 flexes inwardly and outwardly, the heating element 18 will accommodate itself automatically to the curvature and snugly hug the under face of the band 12 at all times so as to transmit heat directly thereinto. Mounted on the under side of each heating element 18 and carried by the rivets 22 in depending relation thereto are conventional bimetallic thermostats 28 connected in series with the coil of Nichrome ribbon 21 and a conventional electrical input line 29 through a terminal block 30 mounted upon the upper face of the base plate 1. The electrical connections are substantially conventional and are schematically illustrated in Figure 8.

Shiftably mounted in, and extending substantially vertically through, the base plate 1 and the flange bracket 10 is an adjustment rod 31 threaded at its lower end for receiving an adjustment nut 32 and washer 33 for abutment against the lower end of a compression spring 34 mounted encirclingly about the lower projecting end of the rod 31 and abutting at its upper end against the under side of the base plate 1.

The rod 31 projects upwardly above the base plate 1 and on its upwardly projecting end is rigidly provided with a cross-head 35 having an upwardly extending hinge leaf 36. Carried by the hinge leaf 36 is a hinge pin 37 projecting at both ends outwardly therefrom for hinge-forming engagement within hinge eyes 38 formed integrally on the lower and inward end of a unitary clamping strap 39 which is substantially as wide as the combined width of the two bands 12 and extends flexibly thereover to the front of the machine. On its forward end, the strap 39 is provided with three transversely aligned hook-like reverse bends 40 spaced from each other by U-shaped clearance slots 41.

Rigidly mounted upon the forwardly presented face of the flange 13 is a forwardly opening U-shaped pivot bracket 42 for supporting the opposite ends of a horizontally extending pivot pin 43 upon which is rockably mounted the upper ends of a split toggle arm 44. Rockably pinned to, and extending swingably between, the split ends of the toggle arm 44 at a point spaced substantially downwardly from the pin 43 is an upwardly extending clevix-like arm 45 rigidly provided at its upper end with a transversely extending bar 46 adapted to be releasably engaged in the hook-like reverse bends 40, the upper ends of the clevis-like arm 45 being adapted to fit loosely within the clearance slots 41. By appropriate adjustment of the nut 32, allowance can be made for different thicknesses of the lining material and the brake shoe flange and, furthermore, the spring 34 can be adjusted to apply various clamping pressures, as may be required. Finally, the spring 34 will allow the strap 39 to give slightly as the temperature rises and the brake shoe, the lining, and the other parts of the device expand, thereby maintaining a practical degree of uniformity in clamping pressure throughout the bonding period.

It will, of course, be evident that, by turning the handle 9 in the appropriate direction, the slide block 5 may be shifted inwardly or outwardly as may be desired. As the slide block 5 is shifted inwardly, for example, from the position shown in full lines to the position shown in dotted lines in Figure 2, the bands 12 and the heating elements 18 carried thereby will flex upwardly and inwardly to assume a semi-circular arc of substantially smaller diameter. The upper face of the base plate 1 may be conventionally provided with a series of graduations for visual correlation with a suitable index mark on the slide block 5 to indicate the diameter of the arc of the bands 12. For example, the graduations can be numbered consecutively from "9" to "12" and so arranged that when the index mark of the slide block 5 is aligned with the graduation bearing the number "9," the bands 12 will be disposed in an arc having a nine inch diameter. If desired, a greater range of adjustment may be provided or intermediate graduations may be provided to permit intermediate fractional settings if for any reason such expedient may be deemed necessary.

At the present time, practically all passenger automobiles employ brake drums having diameters ranging from nine inches to twelve inches and the shoes are usually referred to in the same terms. In other words, a brake shoe which is designed to work within a brake drum having an inside diameter of nine inches is ordinarily referred to as a nine inch shoe. Actually, the diameter of the inside arc or under face of the shoe is substantially smaller than nine inches, but is nevertheless of a standard size. Thus, the graduations on the face of the base plate 1 can be calibrated and numbered, so that, when the index mark on the slide block 5 is precisely in registration with the graduation associated with the number "9," the bands 12 will have an arc of the exact size necessary to conform to the under face of a so-called nine inch brake shoe.

For example, 1949 model Cadillac and Buick automobiles employed a so-called twelve inch brake shoe, that is to say, a brake shoe adapted to co-operate with a twelve inch brake drum. Thus, if it is desired to reline a Buick brake shoe, the handle 9 is turned until the index mark on the slide block 5 is precisely aligned with the graduation numbered "12" and the brake shoe B placed down over the bands 12, so that the web w of the brake shoe slips downwardly through the slot or space 14 between the bands 12.

If the brake shoe B is normal in shape and size, it will fit snugly down in place on the bands 12 without rocking or wabbling. On the other hand, if the brake shoe B has been stretched, shrunken, warped, or twisted in actual use, it will not fit properly on the bands 12 and the particular condition of malformation will be immediately revealed. In effect, the bonding machine A, therefore, serves the very valuable function of gauging the brake shoe B before it is relined to eliminate defective shoes.

If the brake shoe B lines up properly in the machine, it can then be removed and coated with an appropriate bonding adhesive by any conventional method and the preformed section of brake lining x set lightly in place. There are a number of such adhesive bonding agents available, some of which are in the form of heavy viscous liquids or pastes and some in the form of a slightly tacky extruded ribbon or tape. In any case, the adhesive and lining are manually applied to the face of the brake shoe and lined up so as to be in the proper position thereon. The assembled lining and brake shoe are then replaced in the bonding machine A. It may be here noted that, if desired, the brake shoe B may be initially placed in the bonding machine A to test its shape and size and allowed to remain therein while the adhesive and lining x are being manually applied. Thus, it will be seen that the bonding machine A may, if desired, be used as a convenient jig for conveniently holding the brake shoe while the adhesive and lining are being preliminarily set in place.

When the brake shoe B and the section of lining x are in place, the clamping strap 39 is swung forwardly over and upon the upwardly presented arcuate face of the lining and the bar 46 of the clevis arm 45 is engaged in the bends 40. The nut 32 is then adjusted, if necessary, so that the clamping strap will fit snugly down over the brake lining x. Thereupon the toggle arm 44 is swung down into the locked position shown in Figure 2 to draw the clamping strap 39 tightly down and squeeze the brake lining x against the shoe B with a substantial amount of pressure. It will, of course, be evident that the amount of clamping pressure can be varied or adjusted by appropriate adjustment of the nut 32. The switch s is then turned on and the heating element 18 energized. Inasmuch as the heating element 18 is mounted directly against the under face of the bands 12, the heat will be very quickly transmitted through the bands 12 directly into the brake shoe B and to the adhesive bonding agent. Because the brake shoe B is held rigidly in a vise-like grip during the entire heating cycle, it is virtually impossible for the shoe or lining to warp or become otherwise distorted. Finally, the thermostat 28 may be set to maintain a bonding temperature precisely within the optimum range specified for the particular bonding agent or adhesive being used, thus eliminating the danger of overheating the shoe and scorching either the bonding agent or the brake lining itself.

If desired, a modified form of bonding machine A' may be provided, as shown in Figure 9. The bonding machine A' is in every respect identical with the previously described bonding machine A, having flexible bands 12', which are identical in every respect with the flexible bands 12. The machine A' is, however, provided with a gas line 47 having a conventional hand valve 48 and a vertical leg 49 terminating at its upper end in a conventional pipe T 50. Extending outwardly on opposite sides of the T 50 are arcuate burner tubes 51, 52. The rearward burner tube 51 is so shaped and located that it will lie in close proximity to the bands 12', when the device is adjusted for its greatest diametral size, and, on the other hand, the forward burner tube 52 is positioned and contoured for lying in close proximity to the bands 12', when the latter are adjusted to the smallest diametral size.

The bonding machine A' may be connected to any conventional source of fuel gas, illuminating gas, propane, or the like, where, for reasons of convenience or necessity, a heating means other than electricity must be employed.

It is also possible to provide a further modified form of bonding machine C, which comprises a relatively large rectangular base plate 53 provided at its four corners with legs 54. Disposed centrally within the base plate 53 is a slide block 5' operatively mounted on a lead screw 7' which projects outwardly from the forward edge of the base plate 53 and is rigidly provided with a handle 9', all of which elements are substantially similar to the previously described slide block 5, lead screw 7, and handle 9.

Rigidly secured upon the slide block 5' and extending transversely across the upper face of the base plate 53 for shiftable movement therealong is a mounting bar 55 for rigidly supporting the forward ends of four tandem-connected pairs of arcuate bands 12'', the latter being substantially similar to the previously described bands 12 and being rigidly mounted at their rearward ends in uniformly spaced transverse alignment adjacent to the rearward edge of the base plate 53. Each pair of bands 12'' is provided with a clamping strap 39' substantially identical with the previously described clamping strap 39 and adapted for releasable engagement at its forward end with a clamping bar 46' mounted in a clevis-arm 45', which is, in turn, operatively connected at its lower end to a toggle arm 44'.

The modified form of bonding machine C is, in effect, a multiple size bonding device adapted for use in substantially the same manner as the previously described bonding machine A except that a set of four brake shoes can be bonded in a single operation. Obviously, where desired, it is possible to provide multiple size bonding devices adapted to operate simultaneously upon any desired number of brake shoes.

It has also been found, in connection with the present invention, that the heating elements 18 of the bonding machine A may be wired or connected in a modified form of circuit shown in Figure 12. In this modified arrangement, each pair of heating elements 18, together with the thermostat 26 and switch s, is connected through an auxiliary switch s', of the double-throw, double-pole type, in such a manner that the heating elements 18 may be alternatively connected in series or in parallel. When connected in parallel, the thermostat 28 is by-passed and the temperature will be almost twice the normal desired temperature. This type of circuit arrangement makes is possible to place worn brake shoes in the machine. At such elevated temperature, the bonding agent will be carbonized and, therefore, the bonding machine A, when thus wired, can be used for the additional purpose of removing old, worn brake linings from brake shoes prior to the relining operation. The worn brake shoe is placed in the bonding machine A and the auxiliary switch s' moved to the "parallel-connected" positions (as shown in Figure 12) and the main switch s turned on. Almost immediately the temperature rises and the bonding agent is destroyed. Thereupon, the worn section of brake lining material can be knocked loose with a light tap of a hammer. It has been found that the temperature at which the bonding agent is effectively destroyed does not in any way damage the brake shoes themselves. After removal of the worn lining has been completed, the auxiliary switch s' may be moved to its other or "series-connected" position, whereupon the temperature is under control of the thermostat 26 and is held within optimum bonding range.

It should be understood that changes and modifications in the form, construction, arrangement, and combination of the several parts of the brake shoe bonding machine may be made and substituted for those herein shown and described without departing from the nature and principle of my invention.

Having thus described my invention, what I claim and desire to secure by Letters Patent is:

1. A brake shoe relining machine comprising a base, a flexible arcuate member, said member being fixedly attached at one end to the base and being adjustably mounted at its other end on the base, means for shifting the adjustably mounted end of the arcuate member toward the attached end for varying the curvature of the arcuate member, and a flexible clamping band operatively mounted on the base in outwardly spaced concentric relation to said arcuate member.

2. A brake shoe relining machine comprising a base, a flexible arcuate member, said member being fixedly attached at one end to the base and being adjustably mounted at its other end on the base, means for shifting the adjustably mounted end of the arcuate member toward the attached end for varying the curvature of the arcuate member, and a length adjustable, flexible clamping band operatively mounted on the base in outwardly spaced concentric relation to said arcuate member.

3. A brake shoe relining machine comprising a base, a block adjustably mounted on the base, a flexible arcuate member anchored at one end to the base and at the other end to the block, and a flexible clamping band releasably overlying the outer peripheral face of said arcuate member.

4. A brake shoe relining machine comprising a base, a block adjustably mounted on the base, a flexible arcuate member anchored at one end to the base and at the other end to the block, and a length adjustable, flexible clamping band releasably overlying the outer peripheral face of said arcuate member.

5. A brake shoe relining machine comprising a base, a block slidably mounted on the base, means mounted on the base for sliding the block into any selected position of adjustment within the range of movement of the block along the base, a pair of spaced parallel flexible metallic bands rigidly mounted at one end upon the base and extending outwardly therefrom in a substantially circular arc and being rigidly fastened at the other end to the block for supportive engagement against the under face of a brake shoe, the space between the bands being of substantial width to accommodate the brake shoe web, a flexible metallic clamping band swingably mounted at one end to the base adjacent to the point of attachment between the base and the bands, said clamping band being adapted to extend outwardly over and around the outer face of the brake shoe when the latter is supported by the spaced parallel bands, and means on the block for optionally engaging the other end of the clamping band for drawing the clamping band tightly down clampwise upon the brake shoe.

HARRY B. BARRETT.

REFERENCES CITED

The following references are of record in the file of this patent:

UNITED STATES PATENTS

| Number | Name | Date |
| --- | --- | --- |
| 1,926,022 | Barrett | Sept. 12, 1933 |
| 2,416,427 | Bonawit | Feb. 25, 1947 |
| 2,489,496 | O'Brien | Nov. 29, 1949 |
| 2,494,281 | Batchelor | Jan. 10, 1950 |